UNITED STATES PATENT OFFICE.

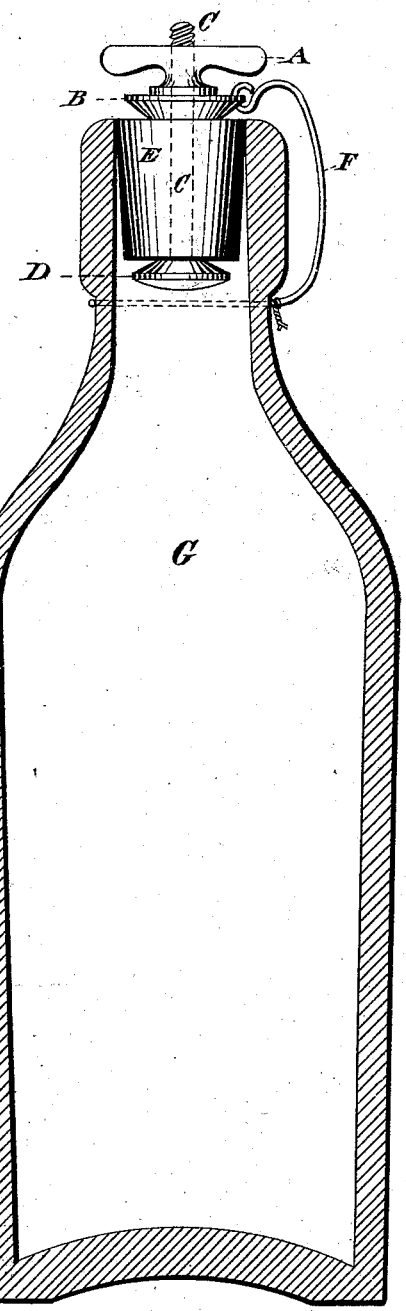

FREDERICK J. SEYBOLD, OF CHICAGO, ILLINOIS.

IMPROVEMENT IN BOTTLE-STOPPER FASTENERS.

Specification forming part of Letters Patent No. 194,788, dated September 4, 1877; application filed June 9, 1877.

*To all whom it may concern:*

Be it known that I, F. J. SEYBOLD, of the city of Chicago, in the county of Cook and State of Illinois, have invented a new and useful Improvement in Bottle-Stopper Fasteners, which improvement is fully set forth in the following specification, reference being had to the accompanying drawing, in which—

G is a bottle, to which is secured, by the wire or cord F, or in any other suitable manner, one of my flexible corks or bottle-stoppers. This stopper is simply a hollow flexible cylinder, preferably rubber—or, as I might say, a flexible tube or a flexible cork, preferably rubber—with a hole through the center longitudinally, through which passes a bolt or wire, C, on which is secured or formed the head or disk D. This head or disk D may be made of any desirable material that is suitable for the purpose, and it may be of any suitable size or shape; but it is made preferably with a beveled side next to the stopper E. The bevel acts more readily to expand the stopper than if the disk were flat on the side next to the stopper. This applies to the washer-disk B, also, and this disk B may, if desirable, be entirely dispensed with, and the nut A press directly against the stopper; but it is desirable to use the washer-disk B, as the nut A will turn more readily against the disk B, made of some hard substance, than it will against the stopper E, which is of a soft and flexible nature.

I do not wish to confine myself to a disk, D or B, made of any particular material or of any particular shape, but claim the use of any suitable material formed into any suitable shape.

The bolt C passes through the stopper E and washer-disk B, in case where I do not dispense with the washer-disk B, and is secured by means of a thumb-nut or screw-handle, A.

I do not confine myself to the use of rubber as material from which to manufacture this stopper, but claim the use of any flexible or compressible and expansive material that will answer the purpose in the manufacture of the stopper.

I do not wish to limit myself to the form of stopper shown in the drawing, lettered E, but claim any suitable form that will accomplish the desired purpose—as, for instance, this stopper E, instead of being a simple hollow cylinder, as shown, may be a hollow rubber sphere, with a hole through it, through which the bolt C passes, and the result will be the same as in the previous case.

Neither do I wish to limit myself to the precise form or size of the disks shown at D and B; but these disks may be elongated longitudinally—that is, in the direction of D and B—and may occupy the majority of the space now occupied by the cylinder E, as shown in the drawing, the intervening space between the two disks, elongated or otherwise, being occupied by a simple hollow flexible sphere, preferably rubber, as before described; and when these disks are brought together by pressure, this flexible sphere will be flattened until it will be essentially two circular plates pressed together, with their circumferences swelled against the inner side of the neck of the bottle, completely filling the orifice and securing the stopper within the same by friction.

The bolt C may be made with a simple head or nut at D, and with a simple head or nut at A, and on this bolt C may be strung two washers, one next to the head or nut D, and the other next to the head or nut A, with a flexible cylinder, sphere, or disk between the two washers. These washers may be made of the ordinary cork-wood, or of any suitable substance.

The washers may act to close the bottle as an ordinary cork does, while the compressing of the two cork-wood washers, or the two washers made of any other suitable material together, by means of the nut A, or by whatever other means it may be desired to use, expands the rubber or other flexible material, placed between the washers out against the inside of the neck of the bottle, creating such a friction between the rubber or other flexible material and the bottle's neck as to prevent the stopper from being blown from the bottle or readily withdrawn only by loosening the pressure on the washer by the nut A, or in whatever other manner it may be applied.

Neither do I limit myself to a screw or principle of a screw as a means of bringing these disks together and compressing the flexible material between them; but claim any mode of bringing them together that will accomplish the desired end—as, for instance, a cam movement, or an eccentric movement, or lever-pressure, or any mode of applying pressure that may accomplish the desired result.

The operation of this stopper is as follows: The stopper is placed in the bottle in the usual way, and then, by turning a nut or handle, A, I bring the two disks D and B toward each other, compressing the rubber or other flexible material longitudinally, and swelling or expanding the same laterally, thereby pressing against the sides of the bottle, and making the cork or stopper perfectly air-tight and secure in the bottle. This tightening can be carried to an extent limited only by the strength of the bottle, or the material of which the stopper is composed.

To prevent losing the stopper, I attach the same to the neck of the bottle by means of a small wire or cord, which is looped into the disk B through a little hole in the same, or fastened around the bolt or washer below the nut A. When the stopper is out of the bottle it is prevented from losing by this wire or cord F, by which it hangs.

What I claim as new and as my invention, and wish to secure by Letters Patent, is—

In combination with the neck-band and the cord F, the screw C, having beveled head D, beveled washer B, and thumb-nut A, for the lateral expansion or contraction of the flexible stopper E, substantially as shown and described, and for the purpose set forth.

FREDERICK J. SEYBOLD.

Witnesses:
  JESSIE E. PHELPS,
  JOHN S. GORTON.